(12) United States Patent
Higashiwaki et al.

(10) Patent No.: US 9,987,691 B2
(45) Date of Patent: Jun. 5, 2018

(54) DRILL AND METHOD OF MANUFACTURING DRILLED PRODUCT

(71) Applicants: MAKOTOLOY Co., Ltd., Osaka (JP); Honda Seimitsu Kogyo Kabushiki Kaisha, Toyama-shi (JP); Fuji Jukogyo Kabushiki Kaisha, Tokyo (JP)

(72) Inventors: Hirofumi Higashiwaki, Mie (JP); Takuya Honda, Toyama (JP); Masao Watanabe, Tokyo (JP); Manabu Saito, Tokyo (JP)

(73) Assignees: MAKOTOLOY CO., LTD., Osaka (JP); HONDA SEIMITSU KOGYO KABUSHIKI KAISHA, Toyama-Shi, Toyama (JP); SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 15/219,074

(22) Filed: Jul. 25, 2016

(65) Prior Publication Data
US 2017/0056981 A1  Mar. 2, 2017

(30) Foreign Application Priority Data

Aug. 31, 2015 (JP) .................................. 2015-170751

(51) Int. Cl.
*B23B 51/02* (2006.01)
*B23B 35/00* (2006.01)
*B23B 51/00* (2006.01)

(52) U.S. Cl.
CPC .............. *B23B 51/02* (2013.01); *B23B 35/00* (2013.01); *B23B 51/009* (2013.01);
(Continued)

(58) Field of Classification Search
CPC .............. B23B 2251/404; B23B 51/02; B23B 2222/28
See application file for complete search history.

(56) References Cited

U.S. PATENT DOCUMENTS 3,912,414 A * 10/1975 Fukura .................... B23B 51/02
                                                         408/144
4,744,705 A *  5/1988 Imanaga ................. B23B 51/02
                                                         408/145
(Continued)

FOREIGN PATENT DOCUMENTS

DE       1 785 012 U     3/1959
DE     296 20 308 U1     4/1997
(Continued)

OTHER PUBLICATIONS

Proquest machine translation of JP 2002-126925, printed Jul. 2017.*

(Continued)

*Primary Examiner* — Daniel Howell
(74) *Attorney, Agent, or Firm* — McGinn IP Law Group, PLLC

(57) ABSTRACT

According to one implementation, a drill that drills at least one of a composite material and a metal is provided. A web thickness at least at a tip of the drill is not less than 5% and less than 25% of at least one diameter of the drill. Further, according to one implementation, a method of manufacturing a drilled product is provided. The drilled product is manufactured by drilling a workpiece using the above-mentioned drill. The workpiece is made of the at least one of the composite material and the metal.

20 Claims, 6 Drawing Sheets

(52) U.S. Cl.
CPC ....... *B23B 2222/28* (2013.01); *B23B 2226/27* (2013.01); *B23B 2226/275* (2013.01); *B23B 2251/14* (2013.01); *B23B 2251/242* (2013.01); *B23B 2251/404* (2013.01)

(56) References Cited

U.S. PATENT DOCUMENTS

| | | |
|---|---|---|
| 5,288,183 A | 2/1994 | Chaconas et al. |
| 8,740,515 B2 * | 6/2014 | Thomas .................. B23B 51/02 408/144 |
| 9,308,589 B2 | 4/2016 | Oka et al. |
| 2014/0356088 A1 | 12/2014 | Santamarina et al. |

FOREIGN PATENT DOCUMENTS

| | | | | |
|---|---|---|---|---|
| DE | 19807609 A1 | * | 6/1999 | ............. B23B 51/02 |
| FR | 2 656 554 A1 | | 7/1991 | |
| JP | H 02-198708 A | | 8/1990 | |
| JP | 03149113 A | * | 6/1991 | |
| JP | 03184707 A | * | 8/1991 | |
| JP | 2001322018 A | * | 11/2001 | |
| JP | 2002126925 A | * | 5/2002 | |
| JP | 2003039218 A | * | 2/2003 | |
| JP | 2008-000836 A | | 1/2008 | |
| JP | 2014-037008 A | | 2/2014 | |
| WO | WO 2013/099841 A1 | | 7/2013 | |

OTHER PUBLICATIONS

Extended European Search Report issued in Application No. 16 184 468.3 dated Jan. 31, 2017.

* cited by examiner

DRILL AND METHOD OF MANUFACTURING DRILLED PRODUCT

CROSS REFERENCES TO RELATED APPLICATIONS

This application is based upon and claims the benefit of priority from Japanese Patent Application No. 2015-170751, filed on Aug. 31, 2015; the entire contents of which are incorporated herein by reference.

FIELD

Implementations described herein relate generally to a drill and a method of manufacturing a drilled product.

BACKGROUND

Conventionally, aiming to drill a composite material or a metal with high precision, various drills have been proposed (for example, refer to Japanese Patent Application Publication JP 2008-000836 A, Japanese Patent Application Publication JP 2014-037008 A, International Publication WO 2013/099841, and Japanese Patent Application Publication JP H2-198708 A). In the case of drilling a composite material, such as GFRP (glass fiber reinforced plastics) or CFRP (carbon fiber reinforced plastics), it is important to reduce delamination and burrs.

An object of the present invention is to enable drilling of at least one of a metal and a composite material with higher precision.

SUMMARY OF THE INVENTION

In general, according to one implementation, a drill that drills at least one of a composite material and a metal is provided. A web thickness at least at a tip of the drill is not less than 5% and less than 25% of at least one diameter of the drill.

Further, according to one implementation, a method of manufacturing a drilled product is provided. The drilled product is manufactured by drilling a workpiece using the above-mentioned drill. The workpiece is made of the at least one of the composite material and the metal.

DETAILED DESCRIPTION

A drill and a method of manufacturing a drilled product according to implementations of the present invention will be described with reference to the accompanying drawings.

(Structure and Function)

Figure 1:
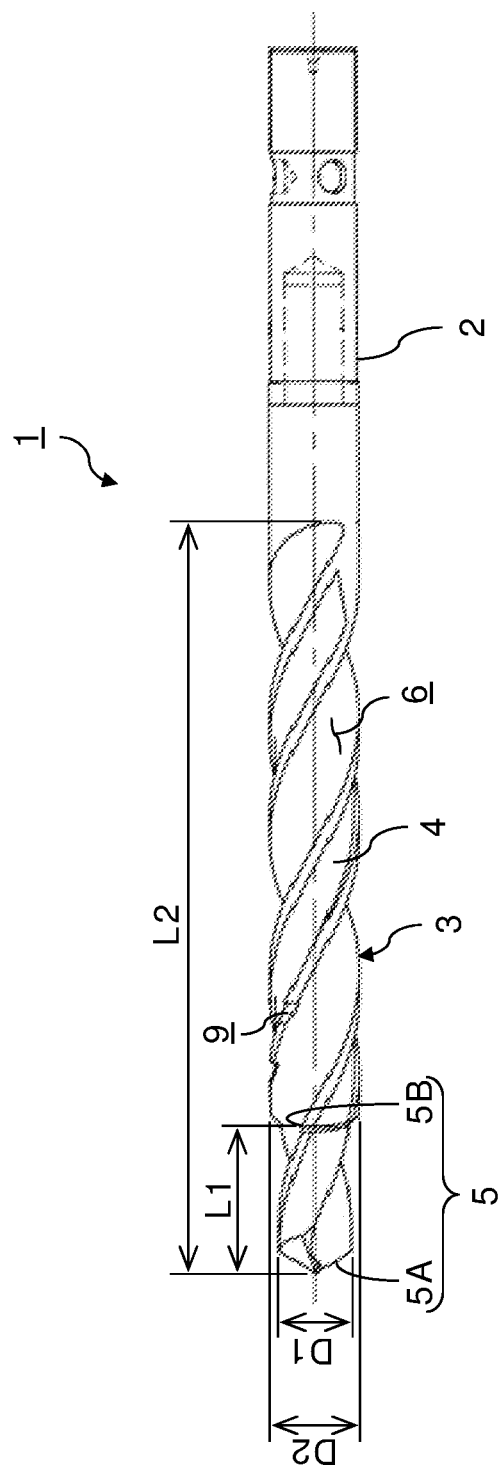
FIG. 1 is a front view of a drill according to an implementation of the present invention.
Figure 2:
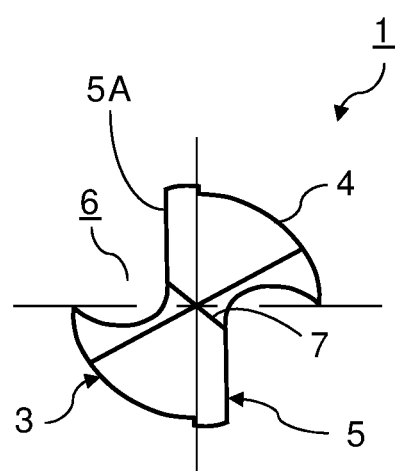
FIG. 2 is an enlarged left side view of the drill shown in FIG. 1.
Figure 3:
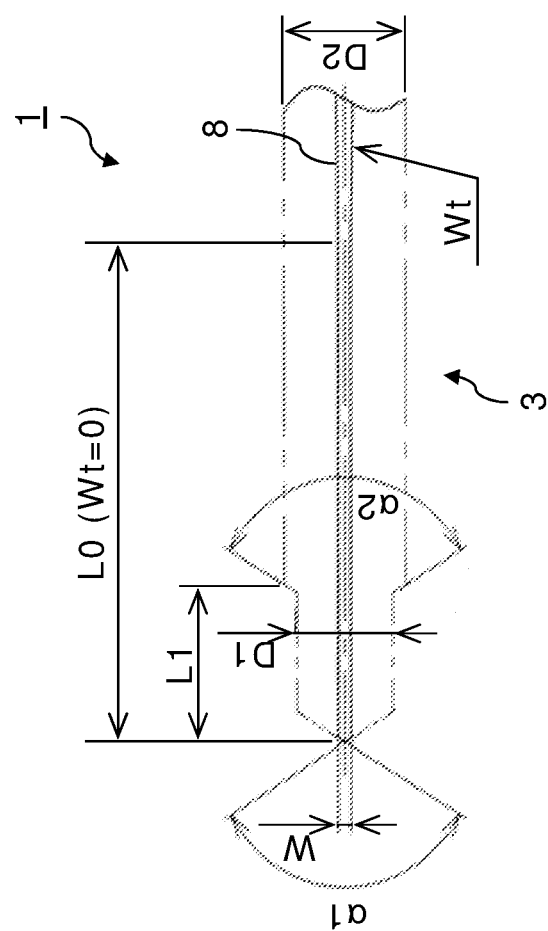
FIG. 3 is a partial longitudinal sectional view showing the shape of the web of the drill shown in FIG. 1.
Figure 4:
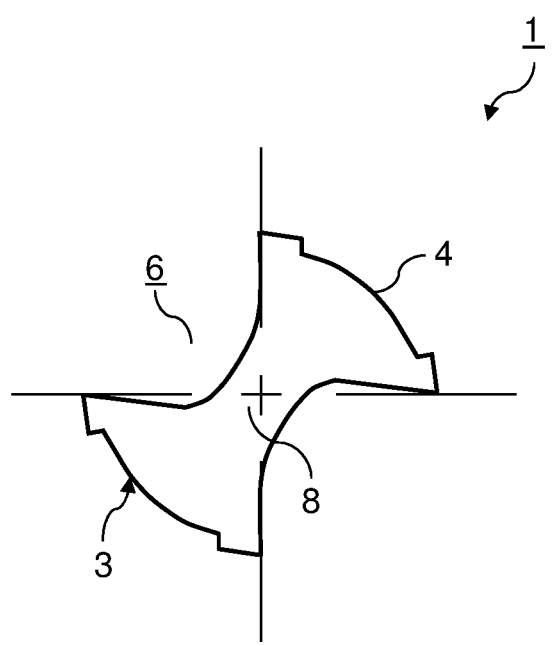
FIG. 4 is an enlarged cross-sectional view of the drill shown in FIG. 1.

FIG. 1 is a front view of a drill according to an implementation of the present invention, FIG. 2 is an enlarged left side view of the drill shown in FIG. 1, FIG. 3 is a partial longitudinal sectional view showing the shape of the web of the drill shown in FIG. 1, and FIG. 4 is an enlarged cross-sectional view of the drill shown in FIG. 1.

A drill 1 has a shank 2 and a body 3. The shank 2 is a portion of the drill 1 to be held by a holder of a machining apparatus, such as a handheld drill driving device or a machine tool. The body 3 is a portion to perform cutting processing of a workpiece. The body 3 has a structure in which cutting edges 5 are formed at the ends in the tip side of lands 4 whose number corresponds to the number of edges.

Since the drill 1 shown in the figures is a two flute drill, the cutting edge 5 has been formed at each end of the two lands 4. A flute 6 is formed between the adjacent lands 4. A ridgeline, formed at the tip of the drill 1, between the lands 4 is called a chisel edge 7. As a matter of course, a desired number of the cutting edges 5 can be formed in the body 3. That is, a drill, having a desired number of edges, such as a four flute drill, can be manufactured. An angle formed between the two cutting edges 5 is called a point angle. A point angle is generally about from 118° to 120°.

The platy portion passing through the central axis of the drill 1 is called a web 8. The board thickness of the web 8 is called a web thickness W. When the web thickness W is thick, the drill 1 has a high strength. On the contrary, cutting resistance in the thrust direction increases since the chisel edge 7 becomes long. Thus, thinning which makes the web thickness W thin at the tip of the drill 1 can be performed in order to shorten the chisel edge 7. Types of thinning include R-shaped, X-shaped, N-shaped, and the like. In the example shown in the figures, X-shaped thinning has been applied.

The drill 1 is for drilling at least one of a composite material and a metal. That is, the drill 1 is for drilling a workpiece made of a composite material, a workpiece made of a metal, or a workpiece made by layering a composite material with a metal. Therefore, it is practical to use a cemented carbide for at least the body 3. That is, it is practical to use a cemented carbide drill as the drill 1. In the case of a cemented carbide drill, the whole drill 1 is usually made of a cemented carbide since the body 3 and the shank 2 are formed integrally by a method for sintering powder or the like.

Alternatively, the body 3 may be made of a material having at least hardness and toughness similar to those of a cemented carbide. For example, a cermet or a ceramic, of which toughness has been improved to the same extent as that of a cemented carbide, having sufficient hardness can be used as a material of the body 3. Alternatively, a high-speed tool steel, of which hardness has been improved to the same extent as that of a cemented carbide, having sufficient toughness can also be used as a material of the body 3.

In the case of the conventional carbide drill for drilling at least one of a composite material and a metal, a web thickness is designed to be at least 25% of a drill diameter in order to secure sufficient strengths to avoid chip of a cutting edge. When the web thickness of drill is thick, cutting resistance in the thrust direction during drilling becomes large, as described above. As a result, when a composite material, such as CFRP, is drilled, there is a problem that delamination occurs at an inlet port of a hole.

Thus, the drill 1 shown in the figures is manufactured so that the web thickness W at least at the tip of the drill 1 becomes not less than 5% and less than 25% of a diameter D of the drill 1, which greatly differs from the conventional stereotype. Then, the length of the chisel edge 7 becomes still shorter, thereby a rake angle can be formed up to the vicinity of the tip of the drill 1. Therefore, cutting resistance in the thrust direction of the drill 1 can be further reduced, and occurrence of delamination at the time of drilling of a composite material can be suppressed satisfactorily. Meanwhile, a strength of the drill 1, necessary for drilling at least one of a composite material and a metal, can be secured.

In the case of drilling at least one of a composite material and a metal, it was confirmed that the most preferable web thickness W at the tip of the drill 1 was not less than 10% and not more than 20% of the diameter D of the drill 1, from a viewpoint of securing the strengths of the drill 1 with reducing cutting resistance in the thrust direction of the drill 1. Therefore, it is preferable to manufacture the drill 1 so that the web thickness W at least at the tip of the drill 1 becomes not less than 10% and not more than 20% of the diameter D of the drill 1.

A drill used for drilling an aircraft part has a diameter not less than the diameter of a drill whose nominal designation number is No. 11 (#11). The diameter of the #11 drill is 4.8514 mm (0.1910 inch). Therefore, the diameter D of the drill 1 can be not less than the diameter of a drill whose nominal designation number is No. 11. The diameter D of the drill 1 may also be larger than 5 mm, from a viewpoint of keeping strengths of the drill 1. The maximum of the diameter D of the drill 1 can be determined preferably according to design requirements of a workpiece, e.g., to 100 mm.

When the web thickness W of the drill 1 is made thin, it becomes important to compensate strengths of the drill 1. Thus, it is preferable to use a step drill, having not less than two diameters, as the drill 1. That is, the shape of the cutting edge 5 can be stepwise. Thereby, it becomes possible to perform step processing which gradually widens the diameter of a hole of a workpiece. Consequently, cutting resistance in the thrust direction can be further reduced and the web thickness W of the drill 1, necessary for securing strengths, can be made thin.

In the example shown in the figures, the drill 1 is a two stage step drill having two diameters D1 and D2. Specifically, the body 3 of the drill 1 has the first cutting edge 5A having the first diameter D1 and the first point angle $\alpha 1$, and the second cutting edge 5B having the second diameter D2 and the second point angle $\alpha 2$. As a matter of course, a more than two stage step drill may also be manufactured.

Furthermore, the torsion strength of the drill 1 can be dramatically improved by considerably tapering at least a part of the web 8. This is because strengths of the web 8 are improved by thickening the web thickness W in the shank 2 side.

When a degree of taper Wt of a web is expressed by an increased amount $\Delta W$ in thickness per unit length $\Delta L$, the conventional drill may also have a web taper which is about Wt=$\Delta W/\Delta L$=0.7/100 in general.

By contrast, the degree of taper Wt=$\Delta W/\Delta L$ of the web 8 of the drill 1 is determined to be not less than 3.5/100 and not more than 7.0/100. That is, at least a part of the web thickness W of the drill 1 is manufactured to be thick not less than 3.5 mm and not more than 7.0 mm per 100 mm in the length direction. The above-mentioned taper of the web 8, which is 5 to 10 times the conventional degree of taper, have efficacy from a viewpoint of improving strengths of the drill 1, regardless of whether the drill 1 is a step drill.

When the drill 1 is a step drill having at least two diameters, the web thicknesses W corresponding to respective diameters can be not less than 5% and less than 25% of the diameters respectively, by changing the web thickness W. In the example shown in the figures, the web thickness W in a portion, having a predetermined length of L0 in the tip side of the drill 1, of the web 8 is constant (Wt=0). Meanwhile, the web thickness W in a portion of the web 8 in the shank 2 side of the drill 1 has tapered with a constant degree of taper Wt. Therefore, the web thickness W of the drill 1 is gradually thickened with corresponding to the two diameters D1 and D2. That is, the web thickness W of the drill 1 intermittently changes corresponding to the two diameters D1 and D2. Consequently, strengths of the drill 1 can be secured with reducing cutting resistance in the tip side of the drill 1.

In particular, in the case of drilling a composite material, generation of burrs besides delamination also poses a problem. Meanwhile, in the case of drilling a metal, it is also desirable to suppress generation of burrs. Thus, it is effective to form nicks 9 on the lands 4 of the drill 1. That is, generation of burrs and delamination can be suppressed by forming the nicks 9 in the drill 1.

Then, a drilled product can be manufactured by drilling a workpiece, made of at least one of a composite material and a metal, using the drill 1 having the features as described above.

The drill 1 as described above is configured by dramatically thinning the web thickness W, giving the cutting edge 5 with a step or steps, and extremely tapering the web thickness W so as to enable securing strengths with considerably reducing cutting resistance.

(Effects)

Accordingly, the drill 1 can suppress generation of burrs and delamination in the case of drilling any of a workpiece made of a composite material, a workpiece made of a metal, and a workpiece made by layering a composite material and a metal. As a result, a workpiece can be drilled in satisfactory accuracy in the case of drilling any of a composite material, a metal, and a laminated material of a composite material and a metal.

The drill 1 shown in the figures was actually manufactured under the following conditions. The first diameter was D1=6.35 mm; the second diameter was D2=7.9375 mm; a length of the body 3 having the first diameter D1 was L1=6.5 mm; a length of the whole body 3 having the first diameter D1 and the second diameter D2 was L2=63.43 mm; the first point angle was $\alpha 1$=120°; the second point angle was $\alpha 2$=120°; the web thickness at the tip of the drill 1 was W=0.79 mm; the length of the web 8 whose web thickness W is constant (Wt=0) was L0=40 mm; and the degree of taper of the web thickness W in the shank 2 side was Wt=3.5/100. Then, titanium was drilled by the manufactured drill 1. In this case, it was confirmed that the drill 1 could drill the titanium in satisfactory accuracy with suppressing generation of burrs. Furthermore, it was also confirmed that the same drill 1 could drill CFRP in satisfactory accuracy with suppressing generation of burrs and delamination.

(Modifications)

Figure 5:
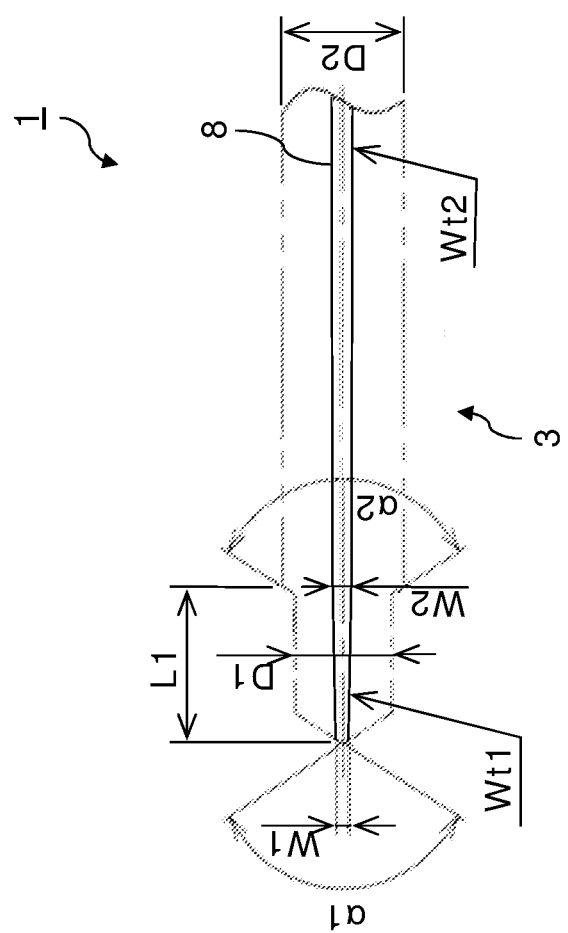
FIG. 5 is a partial longitudinal sectional view showing the first modification of the shape of the web shown in FIG. 3.
Figure 6:
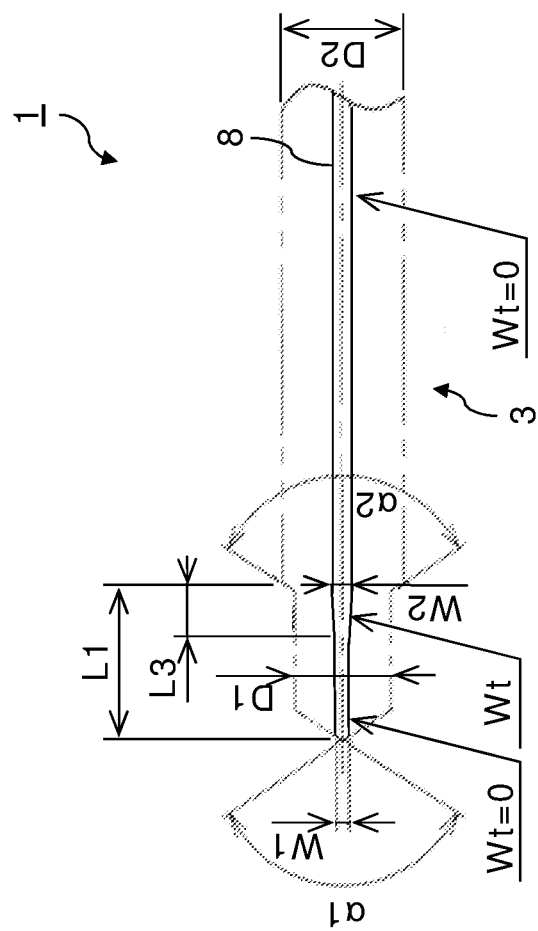
FIG. 6 is a partial longitudinal sectional view showing the second modification of the shape of the web shown in FIG. 3.

FIG. 5 is a partial longitudinal sectional view showing the first modification of the shape of the web shown in FIG. 3. FIG. 6 is a partial longitudinal sectional view showing the second modification of the shape of the web shown in FIG. 3.

The web 8 of the drill 1 can have not only the shape exemplified in FIG. 3 but also various shapes. For example, in the case of a two stage step drill as shown in FIG. 5, the first web thickness W1 at the tip of the drill 1 can be R1% of the first diameter D1 (W1=D1·R1/100) while the second web thickness W2 at the start portion of the second diameter D2 can be R2% of the second diameter D2 (W2=D2·R2/100). Then, the web 8 in the portion having the first diameter D1 can be tapered with the first degree of taper Wt1=(W2−W1)/L1 so that the thickness of the web 8 changes from the first web thickness W1 to the second web thickness W2. Meanwhile, the web 8 in the portion having the second diameter D2 can be tapered with the desired second degree of taper Wt2.

Alternatively, as shown in FIG. 6, the first web thickness W1 at the tip of the drill 1 can be R1% of the first diameter D1 (W1=D1·R1/100) while the second web thickness W2 at the start portion of the second diameter D2 can be R2% of the second diameter D2 (W2=D2·R2/100). Then, the web 8 can be partially tapered by a length L3 so that the web thickness W changes smoothly from the first web thickness W1 to the second web thickness W2, and the web thicknesses W of the web 8 in the other portions can be constant or the web 8 in the other portions can be inclined to the same extent as that of the conventional drill. Thereby, stress concentration resulting from a local change of the web thickness W of the web 8 can be avoided.

As described above, the web 8 can have a partial taper or tapers which have different inclined angles, corresponding to at least two diameters. Thereby, the web thickness W in the tip side of the drill 1 can be made thin so that cutting resistance can be reduced while the web thickness W in the shank 2 side of the drill 1 can be secured so that strengths of the drill 1 can be kept.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A drill that drills at least one of a composite material and a metal,
   wherein a web thickness at least at a tip of the drill is not less than 5% and less than 25% of at least one diameter of the drill, and
   wherein a body of the drill is made of a cemented carbide or a material having at least a hardness and a toughness substantially same to a hardness and a toughness of the cemented carbide.

2. The drill according to claim 1, wherein the body is made of the cemented carbide, a cermet, or a ceramic of a hardness and toughness of a same extent of the cemented carbide.

3. The drill according to claim 1, wherein the at least one diameter is not less than a diameter of a drill of which nominal designation number is 11.

4. The drill according to claim 3, wherein the at least one diameter is larger than 5 mm.

5. The drill according to claim 1, wherein the web thickness at least at the tip of the drill is not less than 10% and not more than 20% of the at least one diameter.

6. The drill according to claim 1, wherein the drill comprises a step drill having at least two diameters, and
   wherein web thicknesses corresponding to the at least two diameters are not less than 5% and less than 25% of the at least two diameters respectively.

7. The drill according to claim 1, wherein at least a part of the web thickness thickens not less than 3.5 mm per 100 mm in a length direction.

8. The drill according to claim 6, wherein a web of the drill has a partial taper or tapers having different inclined angles, the partial taper or the tapers corresponding to the at least two diameters.

9. The drill according to claim 1, wherein at least one land of the drill has at least one nick.

10. A method of manufacturing a drilled product, wherein the drilled product is manufactured by drilling a workpiece using the drill according to claim 1, the workpiece being made of the at least one of the composite material and the metal.

11. The drill according to claim 2, wherein the at least one diameter is not less than a diameter of a drill of which nominal designation number is 11.

12. The drill according to claim 2, wherein the web thickness at least at the tip of the drill is not less than 10% and not more than 20% of the at least one diameter.

13. The drill according to claim 2, wherein the drill comprises a step drill having at least two diameters, and
   wherein web thicknesses corresponding to the at least two diameters are not less than 5% and less than 25% of the at least two diameters respectively.

14. The drill according to claim 2, wherein at least a part of the web thickness thickens not less than 3.5 mm per 100 mm in a length direction.

15. The drill according to claim 2, wherein at least one land of the drill has at least one nick.

16. A method of manufacturing a drilled product, wherein the drilled product is manufactured by drilling a workpiece using the drill according to claim 2, the workpiece being made of the at least one of the composite material and the metal.

17. A method of manufacturing a drilled product, wherein the drilled product is manufactured by drilling a workpiece using the drill according to claim 3, the workpiece being made of the at least one of the composite material and the metal.

18. A method of manufacturing a drilled product, wherein the drilled product is manufactured by drilling a workpiece using the drill according to claim 5, the workpiece being made of the at least one of the composite material and the metal.

19. A method of manufacturing a drilled product, wherein the drilled product is manufactured by drilling a workpiece using the drill according to claim 6, the workpiece being made of the at least one of the composite material and the metal.

20. A method of manufacturing a drilled product, wherein the drilled product is manufactured by drilling a workpiece using the drill according to claim 7, the workpiece being made of the at least one of the composite material and the metal.

* * * * *